United States Patent [19]

Adolfsson

[11] Patent Number: 4,973,186

[45] Date of Patent: Nov. 27, 1990

[54] DEVICE FOR SECURING A MACHINE ELEMENT TO A SHAFT

[75] Inventor: Rune Adolfsson, Borås, Sweden

[73] Assignee: SKF Nova AB, Goteborg, Sweden

[21] Appl. No.: 329,286

[22] Filed: Mar. 27, 1989

[51] Int. Cl.$^5$ ............................ F16B 1/00; F16D 1/00
[52] U.S. Cl. ...................................... 403/24; 403/290; 403/370
[58] Field of Search .................. 403/370, 374, 290, 24

[56] References Cited

U.S. PATENT DOCUMENTS

| 2,168,469 | 8/1939 | Brouwer | 403/374 X |
| 4,160,608 | 7/1979 | Derner et al. | 403/370 |
| 4,530,523 | 7/1985 | Proni | 285/322 X |

*Primary Examiner*—Andrew V. Kundrat
*Attorney, Agent, or Firm*—Eugene E. Renz, Jr.

[57] ABSTRACT

A device for securing a first machine part to a second machine part having a first contact surface and a second contact surface. The first contact surface has at least one external sleeve portion. A threaded locking member cooperatively engaging the sleeve portion is actuatable relative to the sleeve portion to frictonally engage the first and second contact surfaces.

1 Claim, 1 Drawing Sheet

DEVICE FOR SECURING A MACHINE ELEMENT TO A SHAFT

FIELD OF THE INVENTION

The present invention broadly relates to a device for securing a first machine part such as a sleeve of an inner race ring of a ball bearing to a second machine part such as a shaft by means of a locking member. More specifically, in accordance with the present invention, the inner ring has at least one axially directed sleeve portion having a locking surface and a locking member is cooperatively associated with the locking surface to secure the inner ring on the shaft.

BACKGROUND AND SUMMARY OF THE INVENTION

A number of devices currently exist for fixedly securing a first machine part, such as a sleeve of an inner race ring of a ball bearing, to a second machine part such as a shaft. For example, the first machine part may be directly mounted on the shaft by means of a press fit, shrinkage fit or a glue joint. It is also known in the art to provide the inner race ring of the ball bearing with a clamping sleeve having tapering grooves or threads. The sleeve is fixedly secured to the shaft by a fastener such as a nut. However, the force created by clamping the sleeve against the shaft is generally an axial force. This axial force acts primarily against the inner race ring of the ball bearing and is effected by means of a nut member which is tightened along a threaded portion of the clamping sleeve against an end surface of the first machine part. The clamping sleeve and nut are generally manufactured as separate and distinct elements, thereby resulting in relatively high manufacturing costs and a need for precise mounting.

It is an object of the present invention to provide a clamping device of the type aforementioned requiring less expensive manufacturing methods and allowing for simplified mounting. To this end, the present invention incorporates a ball bearing comprised of an inner ring having an arcuate raceway for a plurality of balls. The inner ring is provided with outwardly projecting sleeve portions which are integral with the ring. The sleeve portions are externally threaded so as to be cooperatively engageable with the internal threads of a locking member such as a nut. The locking member circumscribes the sleeve portion which, in turn, is fitted around a shaft. Upon axial rotation of the locking member about the sleeve portion, the sleeve portion is radially deformed to frictionally lock against the shaft. However, the increase in clamping force occurs mainly under the locking member and not under the raceway of the inner ring. Thus, the raceway of the inner ring maintains its shape. In this way, the ball bearing may be fixedly secured to the shaft.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
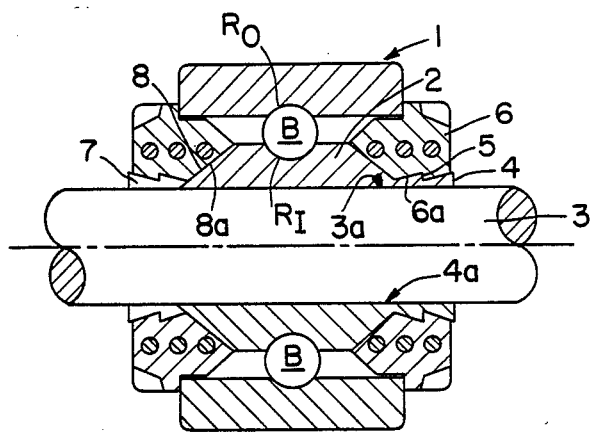
FIG. 1 is a longitudinal sectional view of a device according to the present invention.

Referring now to the drawings, and particularly to FIG. 1 thereof, there is shown a ball bearing 1 comprising inner and outer rings 2a and 2b having confronting arcuate shaped raceways $R_i$ and $R_o$ for a plurality of balls B. The inner ring 2a is provided with sleeve portions 4 which project axially on either side of the raceways $R_i$ and $R_o$ having an external thread 5. The inner ring 2a is mounted to the shaft 3 by means of a locking member in the form of a nut 6 having internal threads 6a complementing the threads 5. In the present instance, the inner ring 2a and sleeve portions 4 are formed integrally and made of a solid material. The nut 6 is made of plastic and reinforced with helical steel rod 10.

The nut 6 circumscribes the sleeve portions 4, which are provided with circumferentially spaced axial slots 7 to facilitate a clamping action when the nut is axially displaced relative to the sleeve portions 4. Thus, when the nut 6 is displaced axially on the sleeve portions 4, the sleeve portions 4 are wedged radially inwardly to frictionally lock the inner ring on the shaft 3. The locking action takes place under the nut 6 outboard of the raceways to minimize radial distortion of the inner ring in this region. Preferably, the thread 5 has a large pitch and its flank forms a relatively small angle $\alpha$ with the axis A—A of the sleeve portion 4. The inner end of the nut 6 is formed with a circumferentially extending angularly disposed contact surface 8 engageable with a slanted frusto-conical surface 8a on the inner ring on either side of the raceways. The contact surface 8 is preferably formed at an oblique angle $\beta$ with reference to a plane P—P perpendicular to the axis A—A of the shaft 3. Thus, when the locking member 6 is threaded toward the raceway 2a of the inner ring 2, a wedge-like action occurs wherein the sleeve portions 4 are radially deformed so as to frictionally lock against the shaft 3. The consequent increase in the radial clamping force will primarily take place under the locking member 6 rather than under the raceway 2a. Thus, the inner ring 2 will maintain its annular shape and not be radially deformed.

Figure 2:
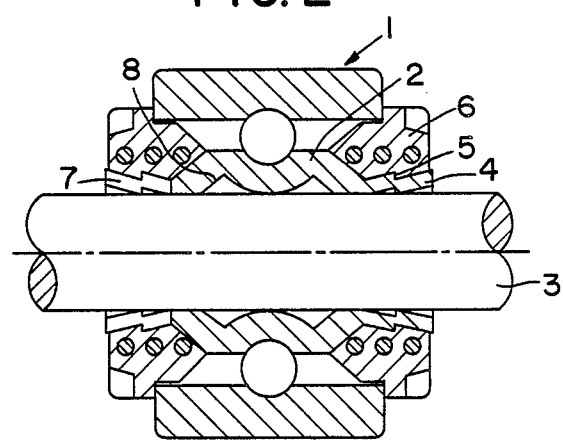
FIG. 2 is a longitudinal sectional view of a further embodiment of locking device according to the present invention.

FIG. 2 shows a modified embodiment of the present invention where similar parts are assigned similar reference numerals. In this embodiment, the inner ring 2 and its associated slotted sleeve portions 7, are fabricated of pressed sheet metal providing a corrugated or undulating configuration as illustrated. The respective inside and outside contact surfaces of the ring 2, sleeve portions 4 about shaft 3 are of a stepped configuration whereas the continuous bore through the ring 2 of FIG. 1 was of uniform diameter through out. Such fabrication is quite economical.

Figure 3:
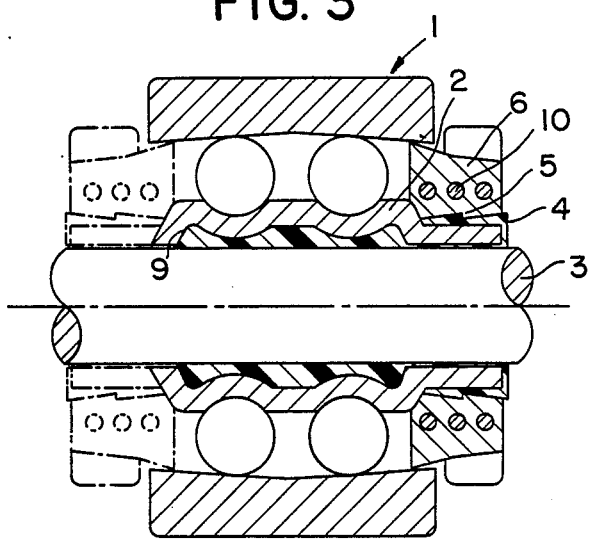
FIG. 3 is a longitudinal sectional view illustrative to yet another embodiment of locking device in accordance with the present invention.

A further embodiment of the present invention is shown in FIG. 3. The illustrated embodiment is similar to the embodiments of FIGS. 1 and 2 with like reference numerals referring to like parts. The inner ring 2 and sleeve portions 4 are made of pressed sheet metal and are embedded in a polymeric material 9 such as rubber or plastic. In addition, the threads 5 of the sleeve portions 4 are formed in the polymeric material 9.

While particular embodiments of the present invention have been illustrated and described herein, it is not intended to limit the invention and changes and modifications may be made therein within the scope of the following claims.

What is claimed is:

1. A device for securing the inner ring of a bearing having a raceway for a rolling element to a shaft (3) having an axis A.A and a peripheral surface defining a contact zone (3a) comprising:

at least one circumferentially extending continuous sleeve portion (4) projecting axially from one end of the inner ring formed integrally therewith, said sleeve portion (4) having external threads with flanks disposed at a predetermined angle to the axis (A—A) of the shaft and disposed radially inwardly of said raceway;

a locking member (6) having internal threads with flank angle complementing the external threads, said locking member and inner ring having confronting engagable contact surfaces (8, 8$^a$) disposed at a common angle to the axis (A—A) of the shaft greater than the flank angle of said internal threads of said locking member (6) whereby relative axial displacement of said locking member to a point where said contact surfaces (8, 8$^a$) engage, said sleeve portion (4) is radially contracted to frictionally lock said contact zone (3a) relative to the bore surface (4a).

* * * * *